April 6, 1954

W. R. BAKER 2,674,694

MULTIPACTOR TUBE OSCILLATOR

Filed May 31, 1951

INVENTOR.
WILLIAM R. BAKER

BY

Roland A. Anderson

ATTORNEY.

Patented Apr. 6, 1954

2,674,694

UNITED STATES PATENT OFFICE 2,674,694

MULTIPACTOR TUBE OSCILLATOR

William R. Baker, Berkeley, Calif., assignor to the United States of America as represented by the United States Atomic Energy Commission Application May 31, 1951, Serial No. 229,197

7 Claims. (Cl. 250—36)

The present invention relates to an improvement in electronic oscillators and more particularly is concerned with an improved multipactor tube oscillator.

Conventional oscillator circuits employ vacuum tube valves to control energy supplied a resonant circuit such as a tank circuit; however, difficulty is encountered in switching large amounts of power for high power oscillators. Although vacuum tubes with very large power ratings are now available and the power ratings are continually being raised, such is accomplished only by increasing the size, cost, and complexity of vacuum tubes.

The present invention provides a replacement for, or successor to, high power vacuum tubes as they are generally known and by utilizing the principle of multipaction in a novel and improved manner overcomes the above-noted limitations thereon, particularly in oscillator circuits. Further, the present invention provides a new and novel oscillator comprising the noted multipaction device, which oscillator is materially advanced and advantageous over those previously known. More particularly, the present invention accomplishes the following primary objects:

The provision of an improved high power oscillator;

The provision of an improved oscillator employing energy transfer by multipaction;

The provision of an improved multipactor oscillator utilizing radiant energy to establish multipaction;

The provision of an improved oscillator including a direct current biased multipactor switch having microwave multipaction control;

The provision of an improved high power oscillator employing multipaction for energy switching;

The provision of a new and improved method of producing self-sustaining high power electrical oscillations;

The provision of a new and improved method of producing multipaction; and

Numerous other objects as will become apparent from the following description.

Figure 1:
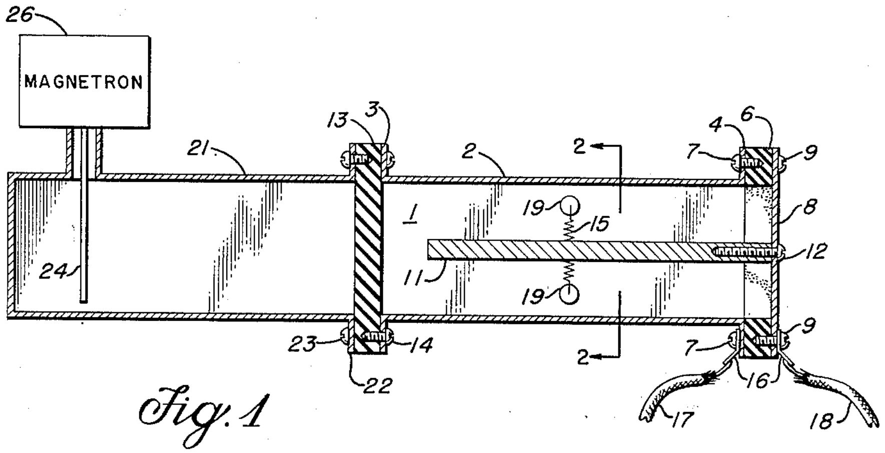
Figure 3:
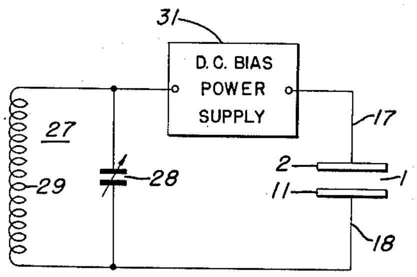
Figure 2:
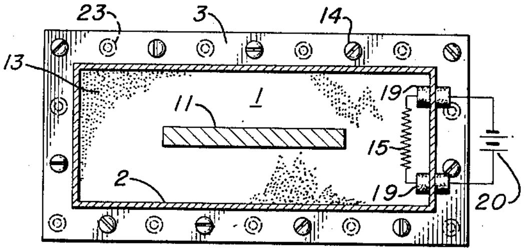
Figure 5:
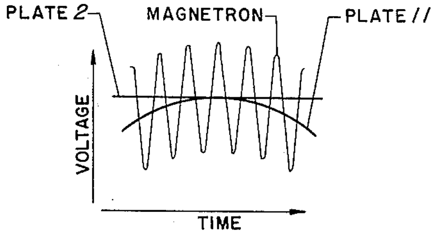
Figure 4:
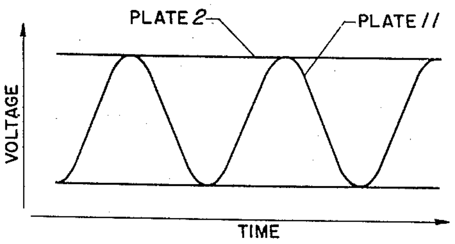

Description of the present invention is facilitated by reference to the attached drawings which comprise:

Figure 1 showing a cross sectional view of a multipactor tube with suitable energization means;

Fig. 2 showing a cross sectional view taken at 2—2 of Fig. 1;

Fig. 3 showing a simplified oscillator circuit including a multipactor tube such as illustrated in Fig. 1;

Fig. 4 showing a simplified voltage-time relationship existing between electrodes of the multipactor tube in the circuit of Fig. 3; and Fig. 5 showing an enlarged portion of the voltage-time relationship of Fig. 4.

Considering now a particular preferred embodiment of the invention and referring to the drawings for an illustration thereof, it will be seen from Figs. 1 and 2 that multipactor tube 1 includes a tube 2 having a rectangular cross section and provided with flanges 3 and 4 at the ends thereof. About one end of tube 2 is an annular insulator 6 having substantially the same outer dimensions as flange 4 and being secured thereto in contiguous relationship by any suitable means, such as screws 7 passing through flange 4 and threadably engaging insulating plate 6. Exterior to tube 2 and abutting insulating plate 6 on the opposite side thereof from flange 4 is situated a conducting plate 8 which may have a similar peripheral configuration and size as insulating plate 6 and which is secured thereto as by screws 9 engaging conducting plate 8 and threaded into insulator 6 to close the end of tube 2.

Also secured to conducting plate 8 and extending therefrom substantially parallel to the widest walls of tube 2 and into tube 2 through insulator 6 is a flat plate electrode 11. Plate 11 is disposed substantially equidistant between the walls of tube 2 and may have a width of about twenty percent or more of the width of the widest walls of tube 2; the useful area of plate 11 being dependent upon the energization thereof as explained more fully below. Plate electrode 11 is mechanically and electrically connected to conducting plate 8 and may be maintained in position by bolts 12 passing through conducting plate 8 and threaded into plate 11.

At the opposite end of tube 2 from conducting plate 8 there is provided an insulating plate 13 having approximately the same outer dimensions as flange 3 about the end of tube 2 and abutting flange 3 in closing relationship to tube 2. Insulating plate 13 is secured to flange 3 by any suitable means such as screws 14 passing through flange 3 and threaded into insulating plate 13. Joints between insulators 6 and 13, conducting plate 8, and tube 2 are maintained vacuum tight by any suitable means and the interior of tube 2 is evacuated, either prior to assembly or continuously during operation.

There may also be provided within multipactor tube 1 an electron source to provide electrons at the initiation of multipaction, for although multipaction will of itself build up from the few free electrons present within tube 2, the buildup time is reduced and more precise control is obtained by the provision of an initial supply of electrons. For this purpose there may be provided a filament 15 within tube 2 and mounted upon lead-in insulators 19 extending through the tube wall in vacuum tight relation thereto, and a suitable filament current source, such as battery 20, may be connected across filament 15 external to tube 2.

Multipactor 1 thus constitutes an electrically conducting envelope or tube 2 having internal thereto and insulated therefrom a plate electrode 11 extending substantially the length of tube 2. External electrical connection is made by appropriate circuitry between tube 2 and conducting plate 8, to which plate electrode 11 is electrically connected, and external connection may be made by lugs 16 held in contact with tube 2 and conducting plate 8 by means of screws 7 and 9, respectively. Electrical leads 17 and 18 are joined to lugs 16 and extend to other portions of the circuit, shown in Fig. 3 and later described.

It is noted at this point that construction details of the illustrated embodiment of multipactor tube 1 are not limiting and that numerous modifications are possible within the scope of the invention. In many applications it is desirable to provide a separate non-conducting vacuum envelope and to produce multipaction between electrodes disposed therein, and also the number and disposition of electrodes within the vacuum envelope may be varied as desired.

Multipactor tube 1 is energized by means of a high frequency source feeding energy through a wave-guide into tube 2 to provide the requisite voltage between plate 11 and tube 2. The waveguide 21 may consist of a metal envelope having the same rectangular cross section as tube 2 and having one closed and one open end. The open end of waveguide 21 is disposed directly adjacent the open end of tube 2, and tube 2 and waveguide 21 are aligned so that electromagnetic energy may be propagated the entire length thereof. The above alignment and disposition is maintained by means of a flange 22 about the open end of waveguide 21, which abuts insulating plate 13 and is secured thereto as by screws 23. There is further provided in waveguide 21 and aperture in one wall thereof through which extends an antenna 24 from a source of high frequency voltage, such as a klystron or magnetron 26. It is of course evident that various types of high frequency oscillators may be employed to energize multipactor 1 through waveguide 21, and in the following description the term magnetron is not to be taken as limiting in this respect. Connection between waveguide 21 and magnetron 26 is accomplished by any suitable means such as a cylindrical extension of waveguide 21 engaging magnetron 26 as shown. Waveguide connections may be maintained vacuum tight and the interior of waveguide 21 evacuated.

In order to transfer energy from magnetron 26 to multipactor tube 1, antenna 24 is directed into waveguide 21 perpendicular to the walls thereof that are aligned with the walls of tank 2 parallel to plate 11. With this arrangement, and antenna 24 energized in the TE mode, electromagnetic energy radiated from antenna 24 travels into tube 2 and the electric field thereof produces a potential difference between plate 11 and adjacent walls of tube 2. A more detailed discussion of the value and frequency of the magnetron voltage is set forth below; however, it is noted at this point that the high frequency output of magnetron 26 passes freely through insulating plate 13 into tube 2.

At this point it may be noted that the above-described elements in effect comprise a waveguide having a plate disposed therein at a critical distance from the walls thereof and the waveguide is energized in the correct mode by electromagnetic energy to produce multipaction and consequent energy transfer between the waveguide walls and the inserted plate. Although multipactor tube 1 is illustrated as a separate unit having a waveguide 21 mounted thereon, such construction is not necessary and multipaction may be produced directly in the waveguide as noted above. Further clarification of the invention may be accomplished by considering the instance wherein waveguide 21, and tube 2, has a width equal to one-half the wavelength of magnetron voltage, in which circumstance maximum potential difference in the radiated field occurs at the center of the width of waveguide 21 and tapers off to substantially zero at the side walls. With such a construction plate 11 need only have a width of approximately twenty percent of the width of tube 2 for only in this distance from the center of tube 2 would the electric field be sufficient to cause multipaction.

Multipactor tube 1 may be connected in an oscillator circuit by means of leads 17 and 18, as shown in Fig. 3. The simplified oscillator circuit illustrated includes a tank circuit 27 having a variable capacitor 28 and an inductor 29 connected in parallel. Multipactor tube 1, shown in Fig. 3 only as a pair of parallel plates for the sake of simplicity, is connected across tank circuit 27 by leads 17 and 18 and there is further provided a direct current bias power supply 31 connected in series between one side of tank circuit 27 and multipactor tube 1, as for example in lead 17. It will, of course, be appreciated that various other and more complicated oscillator circuits may be employed; however, the present simplified circuit has been illustrated for ease of explanation. Output from the oscillator may be obtained in any suitable manner of which many are well known and thus none is illustrated.

Considering the operation of the present invention, attention is first invited to fundamental multipaction theory, for it is by multipaction that energy transfer is accomplished in the present oscillator. In brief, multipaction is a resonant phenomena wherein, under the proper conditions, electron discharge builds up of itself by virtue of the fact that the ratio of secondary electron emission to impinging electrons is greater than unity. In a simple two electrode system proper conditions for the initiation of multipaction occur when the relative polarity of a pair of opposing electrically conducting plates are reversed at a particular frequency and the potential and spacing between the plates has a certain relationship to this frequency. This relationship may be written as:

$$V=K\left(\frac{g}{\lambda}\right)^2$$

wherein: $V$=potential between plates.
$g$=spacing between plates.
$\lambda$=wavelength of alternating current potential between plates.
$K$=a constant dependent in part upon the waveform of the impressed voltage.

The above formula only indicates the voltage required to initiate multipaction and after initiation multipaction occurs over some range of voltage with maximum energy transfer at a slightly larger voltage than that calculated from the formula. Thus the output voltage of magnetron 26 is set at a slightly larger value than that required to initiate multipaction and maximum energy transfer is insured thereby. It should also be noted that in the various possible electrode configurations and dispositions, and particularly where numerous electrodes are employed, care must be exercised to prevent undesirable multipaction between electrodes inadvertently separated by a critical distance, for the large amounts of energy transferred by multipaction can easily cause damage to parts not designed to carry heavy current.

Operation of the oscillator circuit is best described with reference to simplified potential relationships and electrode configurations. Thus in Fig. 3 mutipactor 1 is shown only as a pair of separated plates numbered 2 and 11 and depicting tank 2 and plate electrode 11 of Figs. 1 and 2. Also for the purposes of illustration, the potential of plate 2 has been taken as constant at the potential of one terminal of power supply 31 and the potential of plate 11 taken as varying between the potential of plate 2 and zero at a radiofrequency equal to the resonant frequency of tank circuit 27. Such a relationship is shown in Fig. 4, and there is further shown in Fig. 5 a small portion of one cycle of radiofrequency voltage with the microwave voltage from magnetron 26 superimposed upon the radiofrequency voltage applied between plates 2 and 11.

Considering the operation of the oscillator circuit and first assuming that tank circuit 27 is oscillating at resonant frequency, the voltage relationship between plates 2 and 11 is substantially shown in Fig. 4. At the point in each cycle of radiofrequency tank voltage that the radiofrequency voltage between plates 2 and 11 approaches zero substantially only the microwave magnetron voltage exists between plates 2 and 11, as shown in Fig. 5. As noted above the microwave voltage applied between plates 2 and 11 is of the proper value and frequency to cause multipaction. A large energy transfer by multipaction occurs between plates 2 and 11 over a small range of tank circuit voltage and thus tank circuit 27 is fed energy from power supply 31 once each cycle of radiofrequency tank voltage and resonant oscillations are thereby sustained. It therefore follows that the oscillator circuit is self-controlling and automatically oscillates at the resonant frequency of tank circuit 27, for only once during each cycle of radiofrequency voltage is the bias between plates 2 and 11 reduced to the point that multipaction and consequent energy transfer can occur. It will, of course, be appreciated that the resonant frequency of tank circuit 27 must be quite low compared to the microwave output frequency of magnetron 26 in order that plates 2 and 11 will experience a sufficient number of polarity reversals in the small portion of the radiofrequency cycle where multipaction is possible that a desired energy transfer by multipaction is accomplished.

Various methods of initiating oscillations of tank circuit 27 may be employed; one possible method consisting of first bringing magnetron 26 up to full power output, energizing plates 2 and 11 at the proper potential and frequency for multipaction, and then connecting power supply 31 in the oscillator circuit. Although the potential variation in the oscillator circuit is a well-known transient phenomena, the potential bias from power supply 31 between plates 2 and 11 remains substantially zero until tank circuit 27 obtains its maximum charge and only then does the potential of plate 11 change with respect to plate 2 by the action of tank circuit 27. During this initial transient period multipactor 1 acts as a closed switch because only the microwave potential of magnetron 26 is impressed between the plates thereof and multipaction therebetween thereby continues. It will be seen that the time constant of tank circuit 27 controls only the time for initial charging of the circuit and that multipaction is not initially affected thereby.

Following initial charging of tank circuit 27 the time constant thereof determines the point and duration of multipaction while the microwave output of magnetron 26 produces multipaction at the time and for the duration determined by the resonant radiofrequency tank circuit voltage. It will of course be appreciated that oscillations may be started by an external oscillator energizing tank circuit 27.

The phenomenon of multipaction is not dependent upon particular electron emitting surfaces as are required in vacuum tubes and it is feasible to construct multipactor tube 1 of materials having good structural qualities without sacrificing electron emission quality. It is of advantage, however, to employ electrode materials having good secondary electron emission qualities, of which many are well known.

It will be noted that with the simplified electrode structure and mode of energization illustrated the magnetron voltage impressed between electrodes is not uniform but instead varies with distance from the center of tube 2 or waveguide 21. This nonuniform voltage difference provides a range of voltage values for multipaction and results in multipaction over a greater portion of tank circuit biasing voltage so that a consequently greater energy transfer occurs. Also, advantageous results may be obtained by other combinations of electrode configurations and energizing modes; as for example the use of a TM mode of waveguide energization with a plurality of electrodes spaced along waveguide 21 or tube 2. Also various other effects may be produced which are particularly desirable in certain applications; however, maximum energy transfer occurs with the proper electric field existing between a maximum area of multipaction electrodes. Magnetron 26 may of course be pulse operated as by a control signal from tank circuit 27 in order to minimize the power input to magnetron 26.

From the foregoing, it will be seen that the present invention provides a new and novel multipactor tube and multipactor tube oscillator capable of accomplishing the objects enumerated above and having numerous advantages attaching thereto, as for example the total lack of coupling between the microwave multipaction voltage and radiofrequency output voltage. It will be appreciated that the description and illustration is referenced to a particular preferred embodiment solely for the purpose of clarifying the description and no limitation is intended thereby. Inasmuch as numerous modifications of the invention are possible within the spirit and scope of the invention it is not intended to limit the invention except by the terms of the following claims.

What is claimed is:

1. An improved multipactor tube oscillator comprising a tube having at least two electrodes, a direct current power supply connected to one of said electrodes, a tank circuit connected between said power supply and the other of said electrodes whereby a voltage varying at the resonant frequency of said tank circuit is impressed between said electrodes, a high frequency power source having an antenna and radiating electromagnetic energy, and waveguide means directing said electromagnetic radiation upon said multipactor tube electrodes to impress thereon a voltage of proper magnitude and frequency consistent with the spacing between electrodes to produce multipaction therebetween whereby multipaction and associated energy transfer between said electrodes occurs as controlled by the tank circuit voltage.

2. An improved multipactor tube oscillator comprising a multipactor tube having a vacuum envelope and at least two separated electrodes insulated from each other, a high frequency power source having an antenna radiating electromagnetic energy, waveguide means directing said radiated energy into said multipactor tube and impressing between said electrodes a potential of proper magnitude and frequency for multipaction between said electrodes, a parallel resonant circuit, and a direct current power source connected to said resonant circuit through said multipactor tube whereby the total voltage between the electrodes of said multipactor tube varies with the resonant circuit voltage and multipaction between said electrodes and consequent energy transfer from said direct current power source to said resonant circuit is controlled by the resonant circuit voltage to sustain resonant oscillation of said resonant circuit.

3. An improved multipactor tube comprising an evacuated envelope, a pair of electrodes insulated from each other and separated a predetermined distance, a high frequency oscillator, an antenna connected to said oscillator and radiating high frequency electromagnetic waves, and waveguide means directing said electromagnetic radiation into said envelope, the magnitude, V, and wavelength, λ, of the potential of said radiated waves being related to the spacing, $g$, between said electrodes by the formula $$V=K\left(\frac{g}{\lambda}\right)^2$$

wherein K is a constant depending upon the waveform of said radiated waves and whereby multipaction occurs between said electrodes.

4. An improved oscillator comprising a rectangular waveguide, power supply means energizing said waveguide in the transverse electric mode at a fixed frequency, a plate electrode disposed within said waveguide parallel to top and bottom walls thereof and equidistant therebetween, said electrode being disposed equidistant between the side walls of said waveguide and said waveguide having a width substantially equal to one-half wavelength of the energizing voltage, the distance between said electrode and the top and bottom of said waveguide being directly proportional to the square root of the energizing voltage and to the wavelength thereof, whereby electron multipaction occurs between said plate electrode and parallel waveguide walls, a direct current voltage supply, and a parallel inductance-capacitance resonant circuit connected in series with said direct current power supply between said waveguide and said electrode therein, whereby multipaction in said waveguide occurs at the resonant frequency of said inductance-capacitance circuit to produce resonant oscillations therein.

5. An improved multipactor oscillator comprising a high frequency voltage source, a rectangular waveguide, an antenna connected to the output of said voltage source and extending into said waveguide to energize same in the transverse electric mode, a plate electrode centrally disposed within said waveguide in insulated relation thereto and parallel to and equidistant between top and bottom thereof, the width of said waveguide being substantially equal to one-half wavelength of said energizing voltage and said plate electrode having a width substantially twenty percent of the width of said waveguide, the separation of said plate from adjacent parallel surfaces of said waveguide being proportional to the square root of the energizing voltage and to the wavelength thereof, whereby electron multipaction occurs between said electrode and waveguide, a direct current power supply, and a resonant inductance-capacitance circuit connected in series with said direct current power supply and between said waveguide and the electrode thereof, whereby multipaction occurs at the resonant frequency of said inductance-capacitance circuit for producing oscillations therein.

6. An improved multipactor tube comprising a pair of electrodes, an antenna disposed parallel to the shortest distance between said electrodes, a high frequency oscillator energizing said antenna in the transverse electric mode, and waveguide means between said antenna and said electrodes whereby a potential difference from said antenna is impressed upon said electrodes, said potential having the proper magnitude and frequency to produce multipaction between said electrodes.

7. An improved multipactor tube oscillator comprising an evacuated chamber, a pair of electrodes disposed in said chamber, means establishing standing waves of electromagnetic energy within said chamber with the electrostatic waves being substantially normal to said electrodes whereby a potential is induced therebetween, said potential being of a proper frequency and magnitude to produce multipaction between said electrodes, a direct current power source connected to one of said electrodes and a resonant tank circuit connected to the other of said electrodes whereby the total potential between said electrodes varies with the voltage in said tank circuit and thus energy transfer from said power supply to said tank circuit by multipaction between said electrode occurs at the resonant frequency of said tank circuit and resonant oscillations therein are sustained.

References Cited in the file of this patent

UNITED STATES PATENTS

| Number | Name | Date |
|---|---|---|
| 2,420,744 | Hansell | May 20, 1947 |
| 2,489,131 | Hegbar | Nov. 22, 1949 |